United States Patent
Honda et al.

(10) Patent No.: US 6,549,116 B1
(45) Date of Patent: Apr. 15, 2003

(54) VEHICLE KEY-VERIFYING APPARATUS AND METHOD WITH DECREASED VERIFICATION TIME PERIOD FEATURE

(75) Inventors: Takayoshi Honda, Nagoya (JP); Koichi Kinbara, Hekinan (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/345,951

(22) Filed: Jul. 1, 1999

(30) Foreign Application Priority Data

Jul. 15, 1998 (JP) .......................................... 10-200561

(51) Int. Cl.$^7$ ................................................ H04L 9/32
(52) U.S. Cl. ................... 340/5.61; 340/5.7; 340/10.42; 340/5.72; 340/5.28
(58) Field of Search .............................. 340/5.61, 5.21, 340/5.26, 5.63, 10.1, 10.3, 10.4, 5.72, 5.28; 380/273, 274

(56) References Cited

U.S. PATENT DOCUMENTS

| | | | | |
|---|---|---|---|---|
| 4,763,121 A | * | 8/1988 | Tomoda et al. ........... | 340/10.42 |
| 5,185,796 A | * | 2/1993 | Wilson ....................... | 380/273 |
| 5,561,332 A | * | 10/1996 | Udo et al. .................. | 380/273 |
| 5,561,420 A | * | 10/1996 | Kleefeldt et al. .......... | 307/10.5 |
| 5,684,454 A | * | 11/1997 | Nishioka et al. ........... | 307/10.3 |
| 5,774,550 A | * | 6/1998 | Brinkmeyer et al. ...... | 340/5.7 |
| 5,945,906 A | * | 8/1999 | Onuma ................. | 123/198 DB |
| 6,323,566 B1 | * | 11/2001 | Meier ....................... | 123/179.2 |

FOREIGN PATENT DOCUMENTS

EP          0 835 790          4/1998

* cited by examiner

*Primary Examiner*—Brian Zimmerman
*Assistant Examiner*—Clara Yang
(74) *Attorney, Agent, or Firm*—Nixon & Vanderhye P.C.

(57) ABSTRACT

A key-verifying apparatus for quickly determining whether a key is legitimate, even when a legitimate key is determined not to be legitimate in at least a first iteration of key-verifying processing due to a communication fault or the like. An immobilizer ECU sends query data to a key transponder, receives response data from the transponder, generates auto-response data from the query data and key-discriminating data, and repeats key-verifying processing through determination as to whether the key is a legitimate until the key is determined to be legitimate or until a predetermined number of iterations are completed. The immobilizer ECU, after receiving the response data from the transponder in the present key-verifying processing, immediately initiates sending of query data in the subsequent key-verifying processing, and so the cycle for determining whether a key is legitimate is shortened compared to the cycle of a verifying apparatus that initiates sending of subsequent query data after determining that a key is not legitimate.

13 Claims, 12 Drawing Sheets

FIG. 2

· EEPROM STRUCTURE

| K1 IDENTIFICATION DATA | K1 FUNCTION DATA |
|---|---|
| K2 IDENTIFICATION DATA | K2 FUNCTION DATA |
| K3 IDENTIFICATION DATA | K3 FUNCTION DATA |
| K4 IDENTIFICATION DATA | K4 FUNCTION DATA |
| K5 IDENTIFICATION DATA | K5 FUNCTION DATA |
| K6 IDENTIFICATION DATA | K6 FUNCTION DATA |
| — | — |
| — | — |

FIG. 9

- AUTO-RESPONSE MEMORY REGION STRUCTURE

| K1 IDENTIFICATION DATA | — |
|---|---|
| K2 IDENTIFICATION DATA | K2 AUTO-RESPONSE DATA |
| K3 IDENTIFICATION DATA | — |
| K4 IDENTIFICATION DATA | — |
| K5 IDENTIFICATION DATA | — |
| K6 IDENTIFICATION DATA | — |
| — | — |
| — | — |

VEHICLE KEY-VERIFYING APPARATUS AND METHOD WITH DECREASED VERIFICATION TIME PERIOD FEATURE

CROSS-REFERENCE TO RELATED APPLICATION

The present application is related to, and claims priority from, Japanese Patent Application No. Hei. 10-200561, the contents of which are incorporated herein by reference.

BACKGROUND OF THE INVENTION

1. Field of Invention

This invention relates generally to vehicle security systems, and particularly to a vehicle key-verifying apparatus that decreases the chances of vehicle theft.

2. Description of Related Art

Vehicle theft-preventing systems are conventionally known. Such a system typically includes an electronic immobilizing control unit (hereinafter termed an "immobilizer ECU") that communicates with a transponder incorporated in a vehicle key, and verifies whether data received from the transponder is legitimate. When the data is legitimate, the immobilizer ECU determines that the vehicle key is legitimate and permits starting of the engine. When the data is not legitimate, the immobilizer ECU determines that the vehicle key is not legitimate and prohibits engine starting.

To obtain a high degree of effectiveness in theft prevention, a transponder and an immobilizer ECU of an encrypting type may be utilized. Specifically, as shown in FIG. 12, when the immobilizer ECU provides power to the transponder and transmits query data thereto, the transponder computes response data from function data that is specific authentication data contained in the query data, and sends this response data together with identification data (data for distinguishing the key) to the immobilizer ECU.

Subsequently, the immobilizer ECU relies on the identification data to search its own internal memory for the function data of the transponder, computes auto-response data from this function data and the query data, and collates this auto-response data with the response data from the transponder. When as a result of the collation the two data sets match, the engine is started. However, when the two data sets do not match, the stimulation signal and the query data are sent again, as occasionally a mismatch may occur due to noise or the like despite the key being legitimate. Thereupon, as in the foregoing, the transponder sends the identification data and the response data to the immobilizer ECU, and the immobilizer ECU again collates the auto-response data and the response data.

When an encrypting-type transponder is utilized in this way, even if the response data from the transponder is deciphered by a third party, when the query data from the immobilizer ECU is caused to differ at each iteration, the engine cannot be started even by utilizing the deciphered response data, thereby increasing vehicle security.

However, the sending time from after the immobilizer ECU initiates sending of the stimulation signal and the query data until the reception of the identification data and response data from the transponder corresponding thereto is finished normally requires 100 ms or more. Further, the immobilizer ECU computes the auto-response data before performing collation, but this computing time normally requires 50 ms or more. For this reason, the time required for a single iteration of collation is relatively long, and a considerably long time is required to perform a plurality of collations.

In particular, when the transponder has respective discrete sets of function data, the immobilizer ECU does not know which key has been inserted into the key cylinder until the identification data from the transponder is received, and so the immobilizer ECU cannot search for the function data corresponding to the key within the above-described sending time. Because of this, the need exists to search for the function data in memory on a basis of the identification data sent together with the response data, and thereafter to compute the auto-response data. As a result, subsequent sending performed in a case of a collation mismatch is delayed.

SUMMARY OF THE INVENTION

Therefore, it is an object of the present invention to provide a key-verifying apparatus capable of quickly determining that a key is legitimate, even when a key is determined not to be legitimate in at least a first iteration of key-verifying processing due to a communication fault or the like despite a legitimate key having been used.

More particularly, the present invention provides a key-verifying apparatus wherein a query-sending unit sends query data to a transponder attached to a key. A response-receiving unit receives response data from the transponder, and an auto-response generating unit generates auto-response data with respect to the query data. A key-discriminating unit repeats key-verifying processing, wherein collating of two sets of response data up through determination as to whether a key is legitimate is taken to be one iteration, either until the key-discriminating unit determines the key to be legitimate or until a predetermined number of iterations is completed. Further, in an interval after the response-receiving unit has received the response data from the transponder in present key-verifying processing and until the key-discriminating unit finishes discrimination as to whether a key is legitimate, the query-sending unit initiates sending of query data in subsequent key-verifying processing.

With this key-verifying apparatus, sending of subsequent query data is initiated in after receiving the response data in the present key-verifying processing and continues until it is determined whether a key is legitimate. Compared to a system that initiates sending of subsequent query data after it is determined that a key is not legitimate, receipt time for the subsequent response data can be shortened by an amount equal to the time by which the sending-initiation timing of the query data is shortened. Because of this, the entire cycle for performing determination of whether a key is legitimate is shortened.

Consequently, according to the key-verifying apparatus of the present invention, a key can be determined to be legitimate within a short time, even when it is incorrectly determined not to be legitimate in at least a first iteration of key-verifying processing due to a communication fault or the like.

BRIEF DESCRIPTION OF DRAWINGS

FIG. 2 is a schematic structural view of an EEPROM;

FIG. 9 is a schematic structural view of an auto-response memory region;

DETAILED DESCRIPTION OF THE PRESENT INVENTION

First Embodiment

Figure 1:
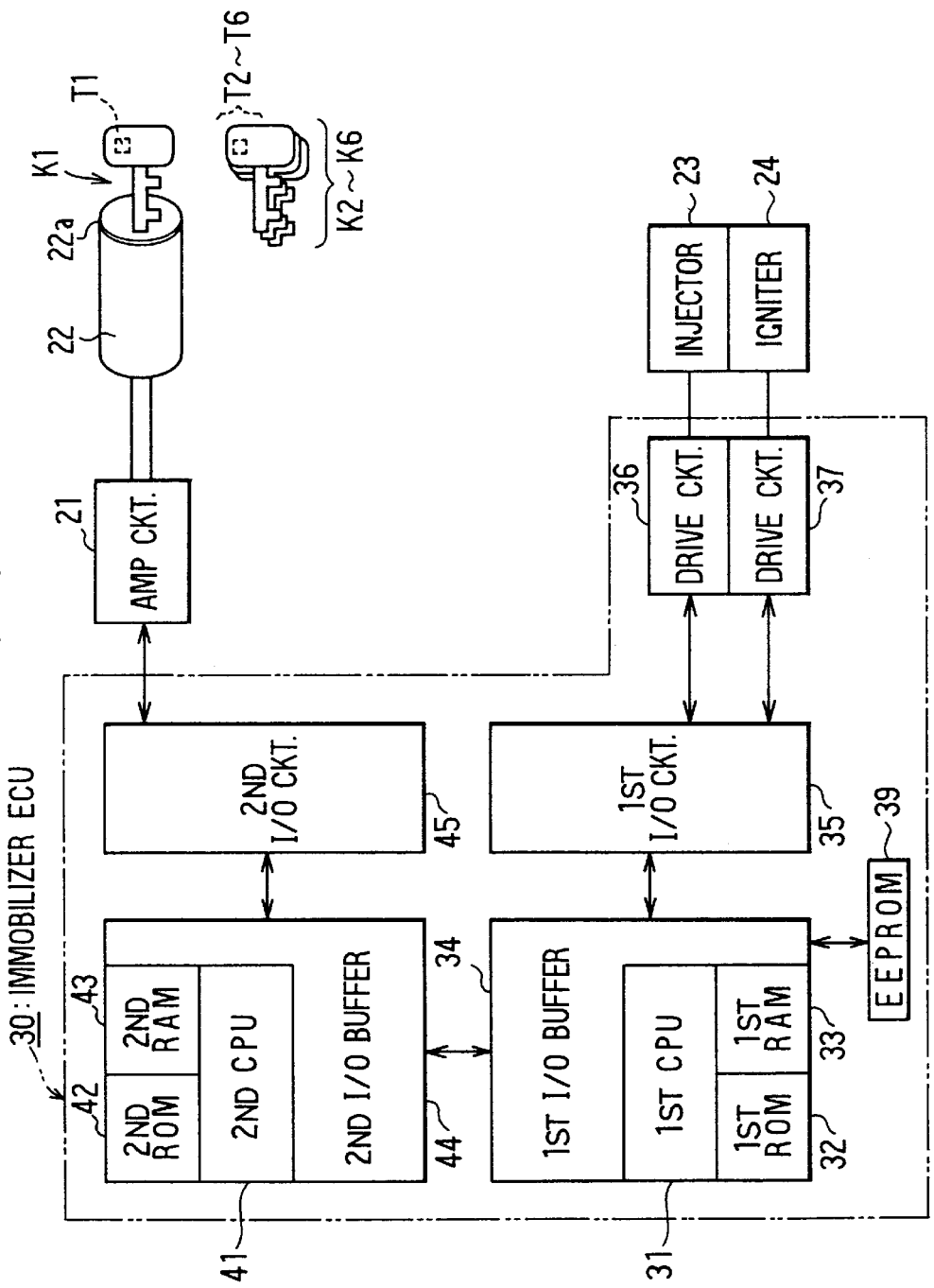
FIG. 1 is a block diagram depicting a schematic structure of a vehicle theft-preventing device according to a first embodiment of the present invention.

FIG. 1 is a block diagram depicting a schematic structure of a vehicle theft-preventing device according to a first embodiment of the present invention, and FIG. 2 is a schematic structural view of an EEPROM utilized by the present embodiment. This vehicle theft-preventing device includes a plurality of legitimate keys K1–K6, an immobilizer ECU 30, an amplifier circuit 21, a key cylinder 22 provided with an antenna 22a, and so on.

The legitimate keys K1–K6 are master keys registered with the immobilizer ECU 30 or pre-registered vehicle keys which are new, and each incorporates a respective transponder T1–T6 therewithin. The transponders T1–T6 are each an encrypting type transponder including function data as discrete authentication data. When each transponder T1–T6 receives a stimulation signal (for example a fixed-frequency sine wave) from the vehicle side via the antenna 22a, each of the respective transponders T1–T6 stores the energy thereof in a capacitor (not illustrated), and operates utilizing this stored energy as a power source. The present embodiment includes six keys K1–K6, but any number of registered number, including as many as eight keys, may be used.

The immobilizer ECU 30 is disposed on the vehicle side, and is provided with a first CPU 31 to execute various control, a first ROM 32 wherein various control programs and the like are stored, and a first RAM 33 to temporarily store various data, as well as a first input/output buffer 34, a first input/output circuit 35, and an EEPROM 39. The first input/output circuit 35 is connected to a drive circuit 36 for an injector 23 and a drive circuit 37 for an igniter 24. The first CPU 31 controls this drive via this first input/output circuit 35, executing engine control for ignition and injection. As shown in FIG. 2, the EEPROM 39 stores function data corresponding to the identification data for the plurality of keys K1–K6. These sets of function data differ for each key.

The immobilizer ECU is also provided with a second CPU 41, a second ROM 42, a second RAM 43, a second input/output buffer 44, and a second input/output circuit 45. The second input/output circuit 45 is connected to the amplifier circuit 21. The second CPU 41 exchanges data with the transponder of a key inserted into the key cylinder 22. The first input/output buffer 34 and the second input/output buffer 44 are connected so that direct memory access (DMA) is possible.

The amplifier circuit 21 receives signals from the immobilizer ECU 30 and transmits from the antenna 22a of the key cylinder 22. For example, when a stimulation signal is received from the second CPU 41 of the immobilizer ECU 30, the amplifier circuit 21 sends the stimulation signal from the antenna 22a.

The key cylinder 22a is provided with a loop-type antenna 22a near the insertion port for the vehicle key, and this antenna 22a is connected to the amplifier circuit 21. The antenna 22a regulates the orientation and stimulation-signal emission time to furnish sufficient energy to communicate with the immobilizer ECU 30 solely to the transponder of a legitimate key in the key cylinder 22.

Figure 3:
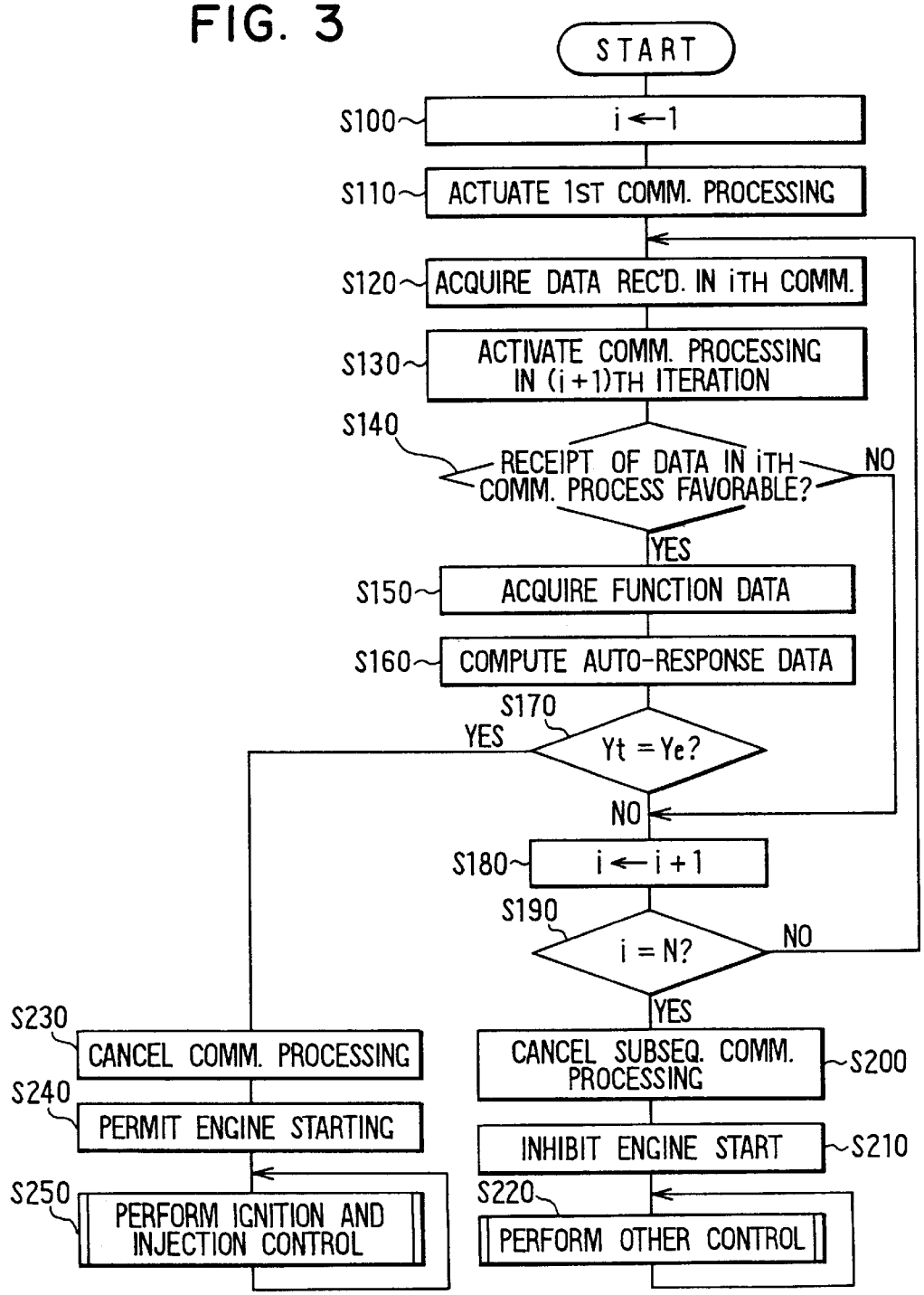
FIG. 3 is a flow diagram of immobilizing processing according to the first embodiment.

A mode of operation of this embodiment will be described next. FIG. 3 is a flow diagram illustrating the immobilizing processing, including key-verifying processing, according to the first embodiment. Initially, when a vehicle key is inserted into the key cylinder 22 and a key switch (not illustrated) is switched on, power is received from a vehicle-mounted battery (not illustrated), and the various electrical systems shown in FIG. 1 assume an operating state.

When the key switch is switched on in this way, at S100, the first CPU 31 of the immobilizer ECU 30 sets a counter value i to "1," and at S110 the first CPU 31 actuates first communication processing in the second CPU 41.

Figure 4:
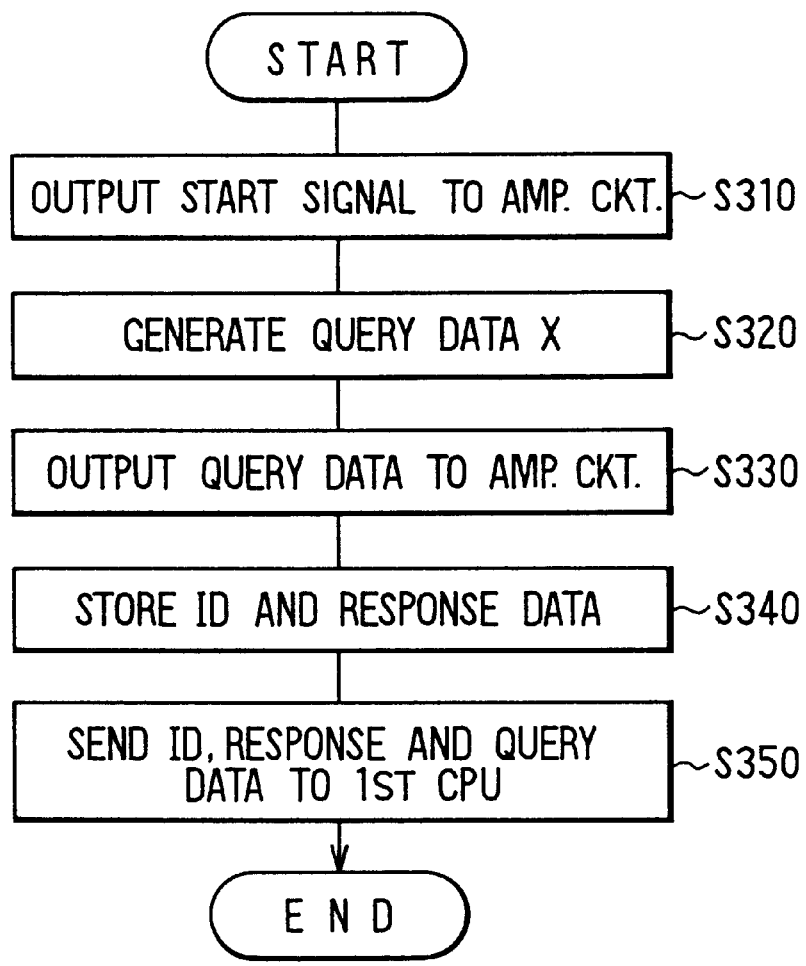
FIG. 4 is a flow diagram of communication processing according to the first embodiment.

When the second CPU 41 starts the communication processing shown in FIG. 4, at S310, the second CPU 41 outputs a stimulation-start signal to the amplifier circuit 21. Then, the amplifier circuit 21 sends a stimulation signal from the antenna 22a. After a fixed time (for example 50 ms) elapses, the second CPU 41 outputs a stimulation-stop signal to the amplifier circuit 21, causing the transmission of the stimulation signal from the antenna 22a to stop. The transponder of the vehicle key inserted into the key cylinder 22 becomes operable due to the sending of this fixed-time stimulation signal.

At subsequent S320, the second CPU 41 causes generation of query data X, which is a set of data generated with a random number. Next, at S330, the second CPU 41 outputs this query data X to the amplifier circuit 21. Thereupon, the amplifier circuit 21 converts this query data X to a frequency (for example, to frequency B when "1," or to frequency C when "0"), and sends the frequency from the antenna 22a. The transponder that receives this utilizes discrete function data Fe (X) (for example operation according to the four fundamental rules of arithmetic or the like), computes response data Yt from the query data X and the function data Fe (X), and sends response data Yt, together with discrete identification data for identifying each of the several transponders as a frequency data set, to the antenna 22a. Thereupon, the amplifier circuit 21 converts the frequency data received from the antenna 22a to a data set of ones and zeros, and sends the data set to the second CPU 41. At S340, the second CPU 41 stores this identification data and the response data Yt in the second input/output buffer 44. At step S350, the second CPU 41 sends this identification data and the response data Yt and the query data X to the first CPU 31 (or the first RAM 33). With this embodiment, because the query data X is generated from a random number in each iteration at S320, the query data X is data that differs in each iteration.

At S120, the first CPU 31 that activated the communication processing in the second CPU 41 at S110 acquires the received data in the ith communication processing in a predetermined region in the first RAM 33. At S130, the first CPU 31 activates the communication processing of the subsequent iteration, that is to say, the (i+1)th iteration, in the second CPU 41. Then, the second CPU 41 initiates the above-described communication processing. Meanwhile, at S140, a determination of whether the result of acquisition of the identification data and the response data Yt received in the ith communication processing is favorable is performed by determining whether the number of bits of the data is correct, or whether the received identification data matches the identification data registered in the EEPROM 39, or the like. When the determination is not favorable (S140), execution proceeds to S180 which will be described later.

Meanwhile, when the determination is favorable (S140), at S150 the function data Fe (X) corresponding to the identification data is searched and acquired from the EEPROM 39. At S160, auto-response data Ye is computed according to this function data Fe (X) and the query data X sent in the ith communication processing. Thereafter, at S170, this auto-response data Ye and the response data Yt received from the transponder are collated to determine whether the two sets of data match.

When the two sets of data do not match at S170, execution proceeds to S180 and the count value i is incremented. At S190, determination of whether this count value i is a predetermined number of iterations N is performed. This predetermined number of iterations N is a value established with cases where communication is unsuccessful due to noise or the like being taken into account. That is to say, a case of a negative determination at S170 may be a case where the key is not a legitimate key, or a case of unsuccessful communication due to noise or the like even when the key is a legitimate key. Therefore, a predetermined number of iterations N is established to remedy the latter case.

When at S190 this count value i does not equal a predetermined number of iterations N (S190), the processing at and after S120 is repeated. When at S190 this count value i is the predetermined number of iterations N, the response data Yt and Ye did not match even once at S170 even when collation was performed for the established number of iterations on account of cases where communication is unsuccessful due to noise or the like. For this reason, in this case a legitimate key is considered not to have been inserted into the key cylinder 22, and at S200 subsequent communication processing is canceled. Thereafter, at S210, engine starting is prohibited, and at S220 other control, specifically, processing and so on to display an abnormality on an LED or the like, is performed.

Meanwhile, when the two sets of data match at S170, the first CPU 31 considers the communicating transponder as legitimate, and cancels communication processing at S230. Thereafter, at S240, the first CPU 31 permits engine starting, and at S250 the first CPU 31 performs ignition and injection control.

The communication processing is canceled at S200 or S230 because the subsequent communication processing is already activated at S130. To cancel communication processing in this way, it is sufficient for example to output a signal to the first CPU 31 and the second CPU 41 to terminate sending of the stimulation signal and the query data X, to output a signal to the first CPU 31 and the second CPU 41 to terminate receiving of the identification data and the response data Yt, or to ensure that the first CPU 31 does not acquire the identification data and the response data Yt received by the second CPU 41.

Figure 5:
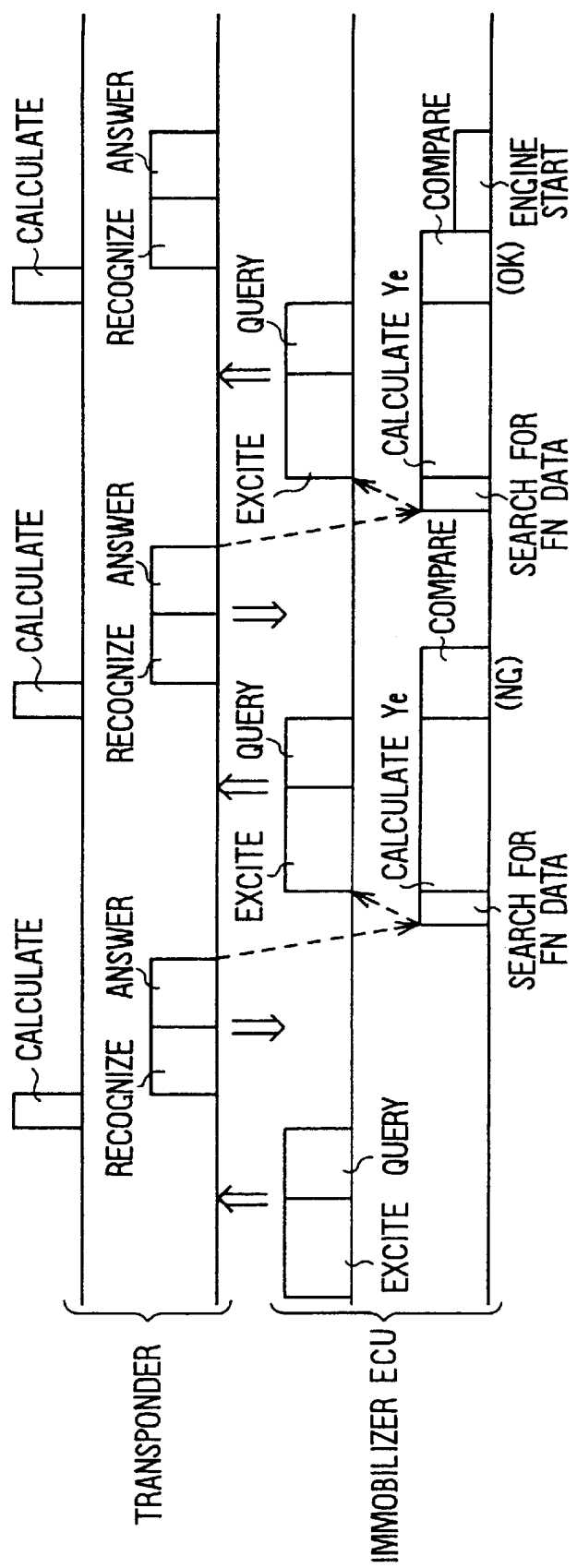
FIG. 5 is a timing diagram indicating processing concomitant with time elapse of the transponder and the immobilizer ECU according to the first embodiment.

A specific embodiment of the processing shown in the above-described flow diagram will be described next with reference to FIG. 5, which indicates processing concomitant with time elapse of the transponder and the immobilizer ECU. Herein, a case of starting an engine utilizing a legitimate key K2 will be described.

When the legitimate key K2 is inserted into the key cylinder 22 and the key switch is switched on, the immobilizer ECU 30 executes the first communication processing (S100 and S110). Namely, when the immobilizer ECU 30 sends the stimulation signal and the query data X (generated from a random number) to the transponder T2, the transponder T2 that receives this computes the response data Yt from the function data Fe (X) and the query data X and sends this response data Yt together with the identification data to the immobilizer ECU 30, and the immobilizer ECU 30 receives this identification data and response data Yt (S310–S350). The required time for this first iteration of communication processing is approximately 100 ms. After this first iteration finishes and the received data is acquired, the immobilizer ECU 30 immediately initiates the second iteration of communication processing (S120–S130). Accordingly, the immobilizer ECU 30 searches for the function data Fe (X) in the identification data received in the first iteration, computes the auto-response data Ye from this function data Fe (X) and the query data X, and collates this auto-response data Ye and the response data Yt received in the first iteration (S150–S170). Herein, the response data Yt received in the first iteration of communication processing is considered to be incomplete data truncated during transmission.

A case where such an incomplete form occurs may be a case where a distance exists between the antenna 22a and the transponder T2 when the key switch is switched on and the stimulation signal is sent to the transponder T2 and sufficient energy is not obtained, for example in a case where the key K2 was slowly inserted into the key cylinder 22. Because the response data is of such incomplete form, the collation result does not match (NO at S170) during the first iteration.

Thereafter, with respect to the second iteration of communication processing which has already been activated, the immobilizer ECU 30 acquires the data received in this communication processing, and thereafter immediately initiates a third iteration of communication processing (S180, NO at S190, S120, and S130). Accordingly, the immobilizer ECU 30 searches the identification data received in the second iteration of communication processing for the function data Fe (X), computes the auto-response data Ye from this function data Fe (X) and the query data X, and collates this auto-response data Ye and the response data Yt received in the second iteration of communication processing (S150–S170). Herein, the response data Yt received in the second iteration of communication processing is considered to be complete. For this reason, the collation result is a match (YES at S170). The foregoing is the second key-verifying processing. Thereafter, the third iteration of communication processing is canceled, and the engine is caused to start (S230–S250).

Effects which will be described hereinafter are obtained according to a vehicle theft-preventing device according to this embodiment.

(1) Before the immobilizer ECU 30 determines whether the collation result is a match after receiving the response data from the transponder in the ith key-verifying processing, the immobilizer ECU 30 initiates sending of the query data in the subsequent, that is, the (i+1)th communication processing. In particular, the generation time to generate the auto-response data in the ith key-verifying processing overlaps with the communication time in the (i+1)th communication processing from sending the query data and until receiving the response data. Because of this, a key can be determined to be a legitimate key within a short time, even when determined not to be a legitimate key in at least a first iteration of key-verifying processing due to a communication fault or the like despite a legitimate key having been used. Consequently, engine starting is not compromised.

(2) When the two sets of response data Yt and Ye match at S170, that is to say, when the key is determined to be legitimate, subsequent communication processing is canceled. By canceling subsequent communication processing in this way, the first CPU 31 or the second CPU 41 can execute other processing (for example initialization or the like).

(3) A vehicle theft-preventing device according to this embodiment is particularly effective for executing a plurality of iterations of key-verifying processing. Other than for example a case of usage in a location susceptible to occurrence of communication error (for example a location having high noise), such may be a case of communication employing a password. With respect to the latter case, when communication with a plurality of transponders is performed, to avoid crosstalk interference when reply communications are received simultaneously from a plurality of transponders, a structure may be utilized wherein the transponders are each assigned a respectively differing password, and response is made solely to the transponder matching the password sent by the immobilizer ECU 30. In this case, however, when for example six transponders exist, communication utilizing six passwords sequentially is performed. Herein, the password of the transponder currently being utilized may be the sixth password sent, and in this case the number of iterations of key-verifying processing becomes large.

(4) In order to update the query data X at each iteration in communication processing, the response data Yt is also updated. Because of this, even if a third party gains knowledge of the response data Yt in the present key-verifying processing by some method and utilizes this response data Yt, the response data Yt ordinarily has been updated, and so there is no determination that the key is legitimate. Consequently, the security afforded by such a system is highly effective.

Second Embodiment

Figure 6:
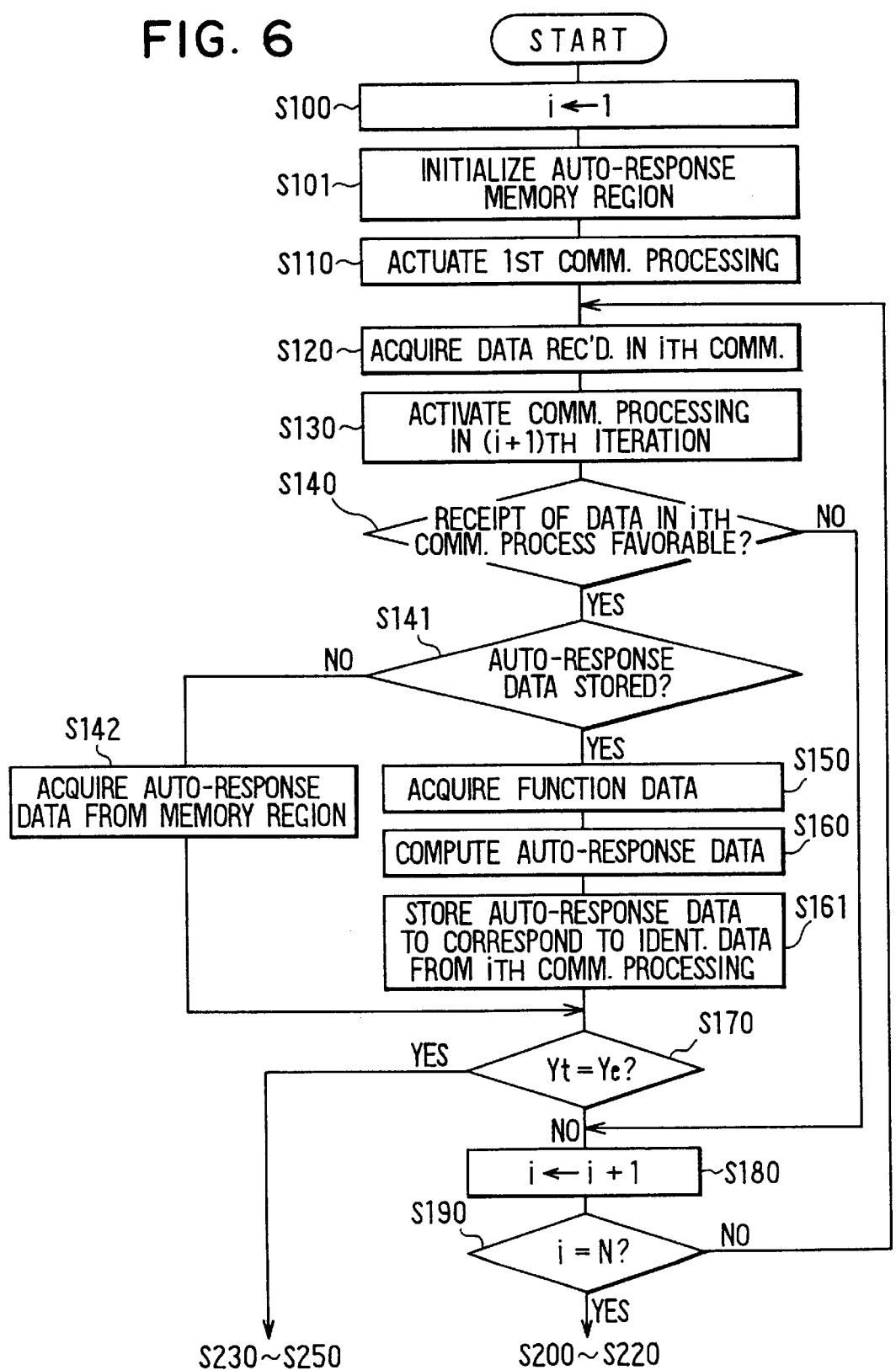
FIG. 6 is a flow diagram of immobilizing processing according to a second embodiment.
Figure 7:
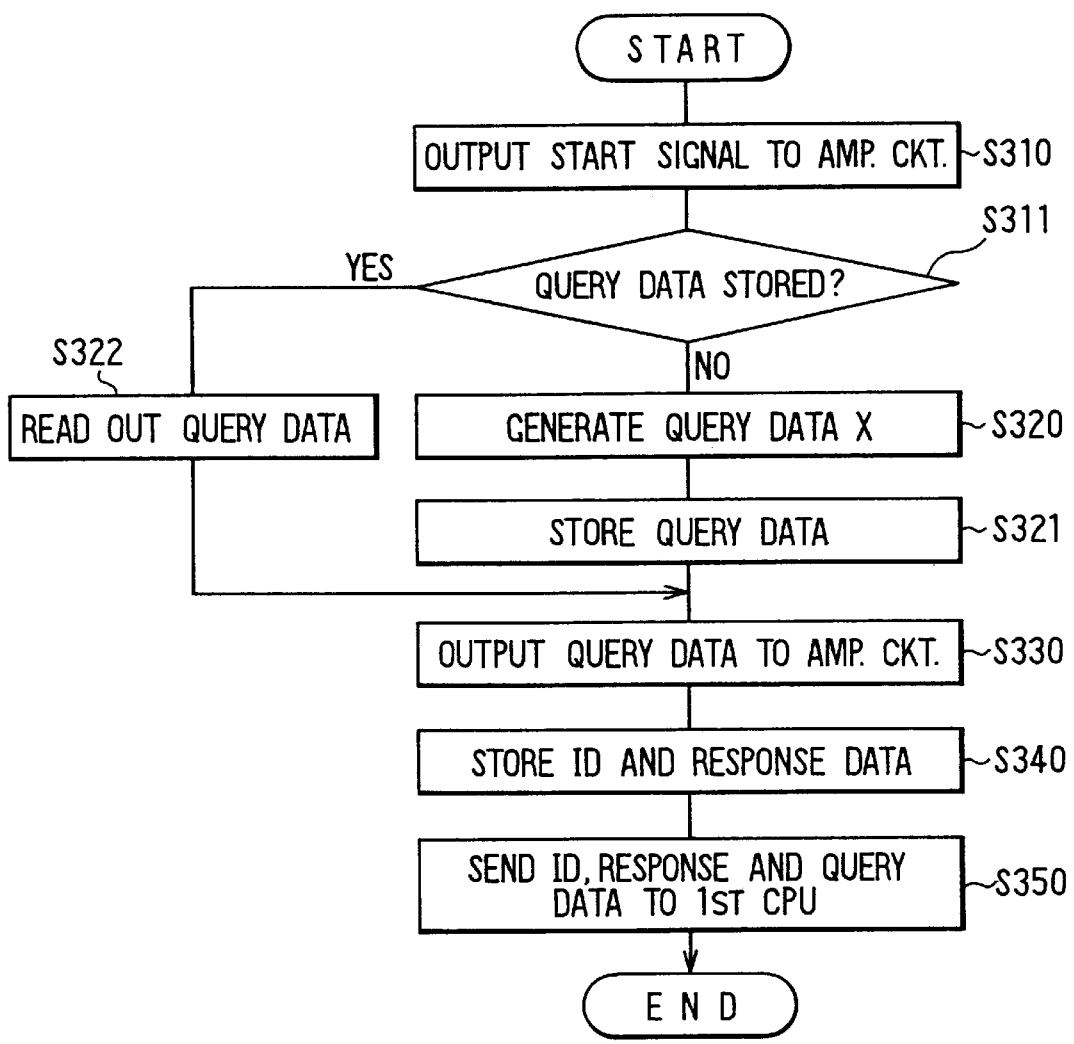
FIG. 7 is a flow diagram of communication processing according to the second embodiment of the present invention.

Because the second embodiment is similar to the first embodiment except with respect to the immobilizing and communication processing, only those features which differ will be described herein. FIG. 6 is a flow diagram of immobilizing processing according to the second embodiment, and FIG. 7 is a flow diagram of communication processing according to the second embodiment. In the flow diagrams, steps identical to those in the first embodiment are assigned symbols identical thereto.

When the key switch is switched on, at S100, the first CPU 31 of the immobilizer ECU 30 sets the count value i to "1." At S101, the first CPU 31 initializes an auto-response memory region (auto-response storing unit) disposed in the first RAM 33 to store the auto-response data Ye and a query memory region (query-storing unit) disposed in the second RAM 43 to store the query data X. At S100, the first CPU 31 actuates first communication processing in the second CPU 41.

When the second CPU 41 starts the communication processing shown in FIG. 6, at S310, the second CPU 41 outputs a stimulation-start signal to the amplifier circuit 21. At S311, the second CPU 41 determines whether the query data X has been stored in the query memory region. When determined at S311 that the query data X has not been stored, execution proceeds to S320, and the second CPU 41 causes generation of query data X. Thereafter, at S321, the second CPU 41 stores the query data X in the query memory region, and thereafter the second CPU 41 performs the processing of the above-described S330–S350. Meanwhile, when it is determined at S311 that the query data X has been stored in the query memory region, execution proceeds to S322 and the second CPU 41 acquires this query data X. Thereafter, the second CPU 41 executes the processing of the above-described S330–S350. As a result, in the first iteration the query data X is generated from a random number, but in the second iteration and after the same query data X as in the first iteration is sent to the transponder.

The first CPU 31 which activated the communication processing in the second CPU 41 at S100 acquires, at S120, the received data in the ith communication processing, and at S130, the first CPU 31 activates the communication processing of the subsequent iteration, that is to say, the (i+1)th iteration, in the second CPU 41. At S140, the first CPU 31 determines whether the result of acquisition of the ith communication processing is favorable. When determined not be favorable at S140, processing at and after S180 according to the first embodiment is performed. Meanwhile, when the acquisition result of the ith communication processing determined at S140 to be favorable, execution proceeds to S141.

At S141, the first CPU 31 determined whether the auto-response data Ye corresponding to the identification data received in the ith communication processing is stored in the auto-response memory region. When determined that such auto-response data Ye has been stored, execution proceeds to S142, and the first CPU 31 acquires auto-response data Ye from the auto-response memory region. At S170, the first CPU 31 compares this auto-response data Ye with the response data Yt received in the ith communication processing, and thereafter performs the processing of the above-described S180 and after according to the first embodiment.

Meanwhile, when it is determined at S141 that such auto-response data Ye has not been stored, execution proceeds to S150, and the function data Fe (X) corresponding to the identification data received in the ith communication processing is searched and acquired. At S160, the auto-response data Ye is computed according to this function data Fe (X) and the query data X received in the ith communication processing. At S161, this auto-response data Ye is stored in the auto-response memory region to correspond to the identification data received in the ith communication processing. Thereafter, at S170, this auto-response data Ye and the response data Yt obtained in the ith communication processing are compared, and thereafter the processing of S180 and after according to the first embodiment is performed.

Figure 8:
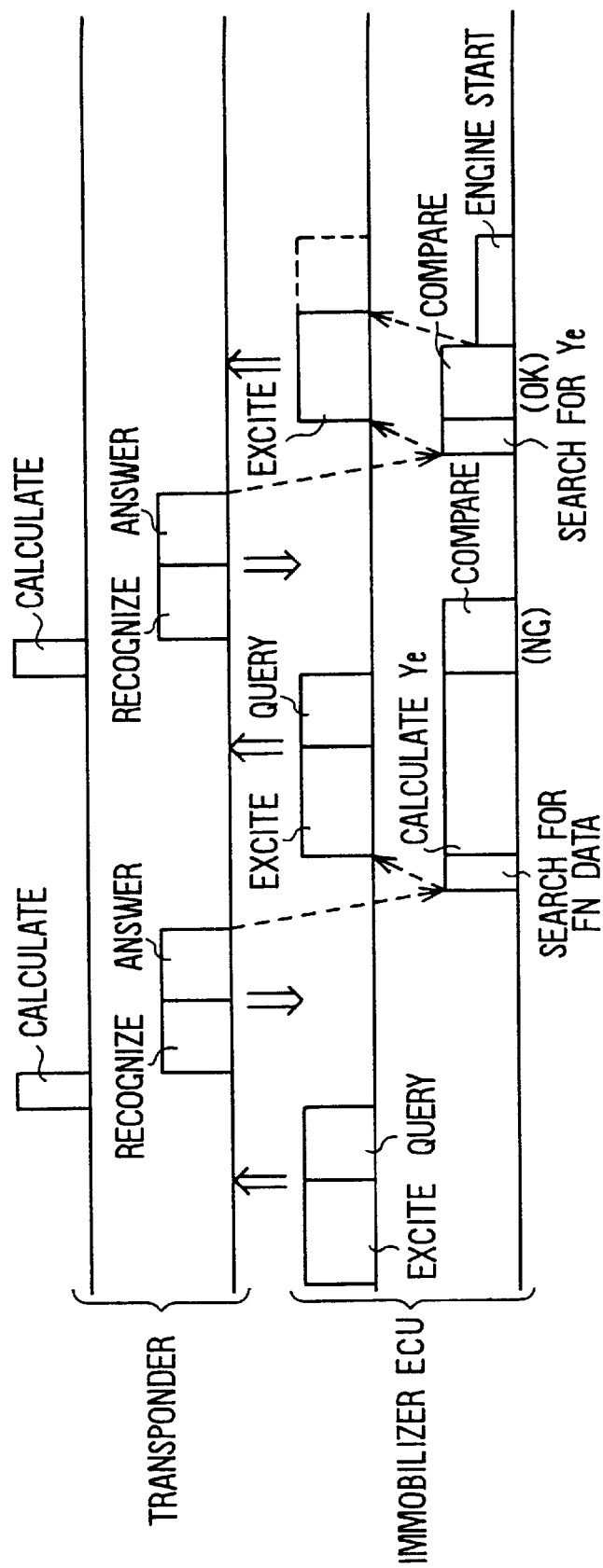
FIG. 8 is a timing diagram indicating processing concomitant with time elapse of the transponder and the immobilizer ECU according to the second embodiment.

A specific embodiment of the processing of the above-described flow diagram will be described next with reference to FIG. 8, which is a timing diagram indicating processing concomitant with time elapse of the transponder and the immobilizer ECU. Herein, a case of causing an engine to start utilizing a legitimate key K2 will be described.

When the legitimate key K2 is inserted into the key cylinder 22 and the key switch is switched on, the immobilizer ECU 30 initializes the query memory region and the auto-response memory region and executes the first communication processing (S100 and S110). This first communication processing is executed similarly to the first embodiment, but the query data X is stored in the query memory region (S310–S350). After this first iteration of communication processing finishes and the received data is acquired, the immobilizer ECU 30 immediately initiates the second iteration of communication processing (S120 and S130). In the second iteration of communication processing, the query data X is acquired from the query memory region and so is identical to the query data X of the previous iteration, that is to say, the first iteration (YES at S311, S322, and S330).

Accordingly, the immobilizer ECU 30 searches for the function data Fe (X) in the identification data received in the first iteration of communication processing, computes the auto-response data Ye from this function data Fe (X) and the query data X, and collates this auto-response data Ye and the response data Yt received in the first iteration of communication processing, but stores the computed auto-response data Ye in the auto-response memory region (S150–S170). Herein, the response data Yt received in the first iteration of communication processing is considered to be incomplete data truncated during transmission. For this reason, the collation results do not match (NO at S170) during this first iteration of key-verifying processing.

FIG. 9 is a schematic structural view of the auto-response memory region, and at the time when the first iteration of communication processing finishes, as shown in this drawing, the auto-response data Ye corresponding to the identification of the legitimate key K2 is stored therein.

Thereafter, with respect to the second iteration of communication processing which has already been activated, the immobilizer ECU 30 acquires the data received in this communication processing, and immediately initiates a third iteration of communication processing (S180, NO in S190, S120, and S130). However, the query data X of this third iteration of communication processing is identical to the query data X of the previous iteration (YES at S311, S322, and S330).

Accordingly, in the second iteration of key-verifying processing, the auto-response data Ye corresponding to the identification data of the legitimate key K2 has been stored in the auto-response memory region, and so the immobilizer ECU 30 acquires this auto-response data Ye and collates this auto-response data Ye and the response data Yt received in the second iteration of communication processing (YES at S141, S142, and S170). Herein, the response data Yt received in the second iteration of communication processing is considered to be complete. For this reason, the collation result is a match (YES at S170) during the second iteration. Thereafter, the third iteration of communication processing is canceled, and the engine is started (S230–S250).

According to this embodiment, the results (1)–(3) of the first embodiment are obtained, as are the results which will be described hereinafter. Namely, as shown in FIG. 8, even when a legitimate key is determined by the key-discriminating unit not to be legitimate in at least a first iteration of key-verifying processing due to a communication fault or the like, the generation time for the auto-response data Ye in the second iteration and after is unnecessary. Because of this, when the time required to generate the auto-response data Ye is longer than the time required for communication processing in particular, the cycle for determining whether a key is legitimate is further shortened, and determination of whether a key is legitimate can be performed within a shorter time.

Third Embodiment

A third embodiment is a sample application of the second embodiment. The steps S100–S170 in the immobilizing processing shown in FIG. 6 in the second embodiment are taken to be a first iteration of key-verifying processing. In this immobilizing processing, processing until the collation result is a match at S170 or until the number of iterations of the key-verifying processing at S190 reaches a predetermined number of iterations N is taken to be one term. It may be noted that in the third embodiment, each time the power source of the immobilizer ECU 30 is switched on, the immobilizing processing in FIG. 6 is initiated.

Figure 10:
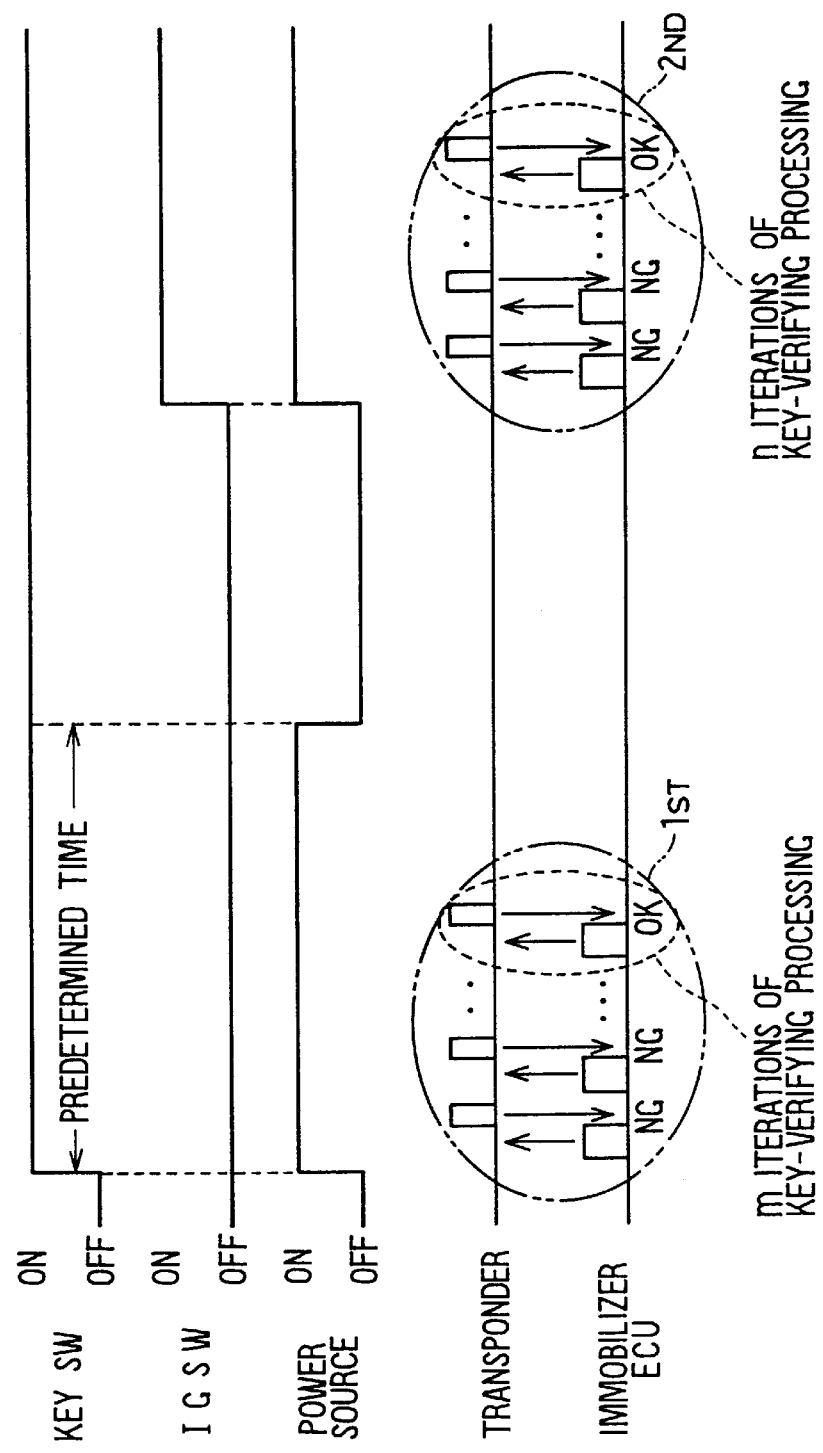
FIG. 10 is a timing diagram indicating processing concomitant with time elapse of the transponder and the immobilizer ECU according to a modification of a third embodiment of the present invention.

FIG. 10 is a timing diagram indicating processing concomitant with time elapse of the transponder and the immobilizer ECU according to the third embodiment. When a key switch (indicated as "key SW" in FIG. 10) is switched on, the power source of the immobilizer ECU 30 is switched on. When a predetermined time elapses with the ignition switch (indicated as "IGSW" in FIG. 10) in an "off" state while the key switch remains on, and the ignition switch is switched on while in such a non-powered state, the power source is switched on.

This immobilizer ECU 30 ordinarily initiates immobilizing processing with the timing with which the key switch is switched on. This is because even if the immobilizing processing were ordinarily initiated with the timing with which the ignition switch is switched on, with this timing the starter is actuated and voltage drops, and so communication with the transponder may not proceed smoothly, and the engine may be difficult to start. For this reason, immobilizing processing is ordinarily initiated with the timing with which the key switch is switched on. However, immobilizing processing is also initiated with the timing with which the ignition switch is switched on when a predetermined time elapses with the ignition switch in an "off" state while the key switch remains on.

The first term in FIG. 10 indicates a state wherein when a legitimate key is inserted into the key cylinder 22, the key switch is switched on, and the power source for the immobilizer ECU 30 is switched on, the immobilizing processing shown in FIG. 6 is initiated, the collation result of the mth iteration (where $1 \leq m \leq N$) of key-verifying processing is a match and the key is determined to be legitimate, and engine starting is permitted. This first term is made up of m iterations of key-verifying processing. In this first term, the communication processing shown in FIG. 7 is executed m times, but the query data sent from the immobilizer ECU 30 to the transponder is all identical.

After the key has been determined to be legitimate in this way, ordinarily, the key is turned and the ignition switch is switched on, and ignition and injection control are executed. However, to prevent depletion of the battery when for example a vehicle is allowed to stand with the key switch remaining on without switching on the ignition switch, such as when the vehicle is exported, the power source for the immobilizer ECU 30 is automatically switched off when a predetermined time (for example one minute) elapses with the key switch on and the ignition switch in an "off" state. When the power source for the immobilizer ECU 30 is switched off, the collation results are deleted. Accordingly, when thereafter the ignition switch is switched on, the power source for the immobilizer ECU 30 is again switched on, and the second term is initiated.

That is to say, the immobilizing processing shown in FIG. 6 is initiated, the collation result of the nth iteration (where $1 \leq m \leq N$) is a match, engine starting is permitted, and the engine is started. This second term is made up of n iterations of key-verifying processing.

In the first iteration of key-verifying processing of this second term, after the power source for the immobilizer ECU 30 is switched on, at S101 in FIG. 6 the query memory region and the auto-response memory region are initialized, and the contents of memory are deleted, and so the determination at S311 in FIG. 7 is negative, and at S320 new query data X is generated. For this reason, in the second term, query data X differing from the query data X at the time of termination of the first term is sent.

A structure may be utilized wherein the contents of the query memory region and the auto-response memory region are maintained as long as the key switch is on. With this structure, in the second term as well the query data X sent to the transponder is the same as in the previous iteration, that is, as in the first term. When this structure is utilized, however, when a third party utilizes some method to keep the key switch always on, the same query data is sent to the transponder no matter how much time elapses, and determination of whether the key is legitimate is performed with the same query data no matter how much time elapses.

For this reason, when a third party seeks out the response data Yt by some method and utilizes this response data Yt, there exists a problem that a collation match may be determined despite not having a legitimate key. Accordingly, with this embodiment, when the previous term is completed and the key is determined to be legitimate, in the subsequent term query data X differing from the query data X at the time of completion of the previous term is sent, response data Yt differing from the response data Yt at the time of completion of the previous term is requested, and the above-discussed limitation is thus overcome.

It should be appreciated that the present invention is not exclusively limited to the above-described embodiments, but may be achieved in various modes which fall within the technical scope of this invention.

For example, with the above-described embodiments, the immobilizer ECU 30 includes two CPUs 31 and 41, with the first CPU 31 executing the immobilizing processing which is the main flow and the second CPU 41 executing the communication processing which is a portion of the immobilizing processing. However, the immobilizer ECU 30 may include one CPU to execute the communication processing as a subroutine in parallel with the immobilizing processing through multi-tasking.

Figure 11:
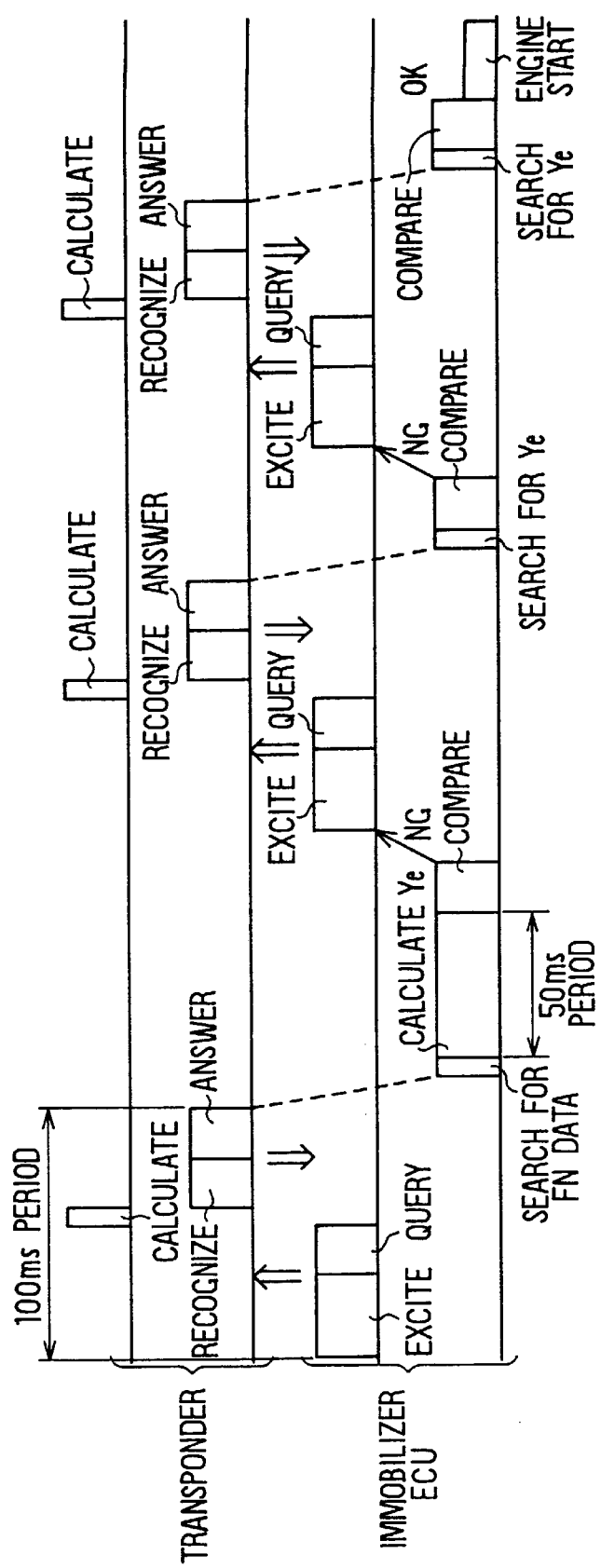
FIG. 11 is a timing diagram indicating processing concomitant with time elapse of the transponder and the immobilizer ECU according to a modification of the second embodiment.
Figure 12:
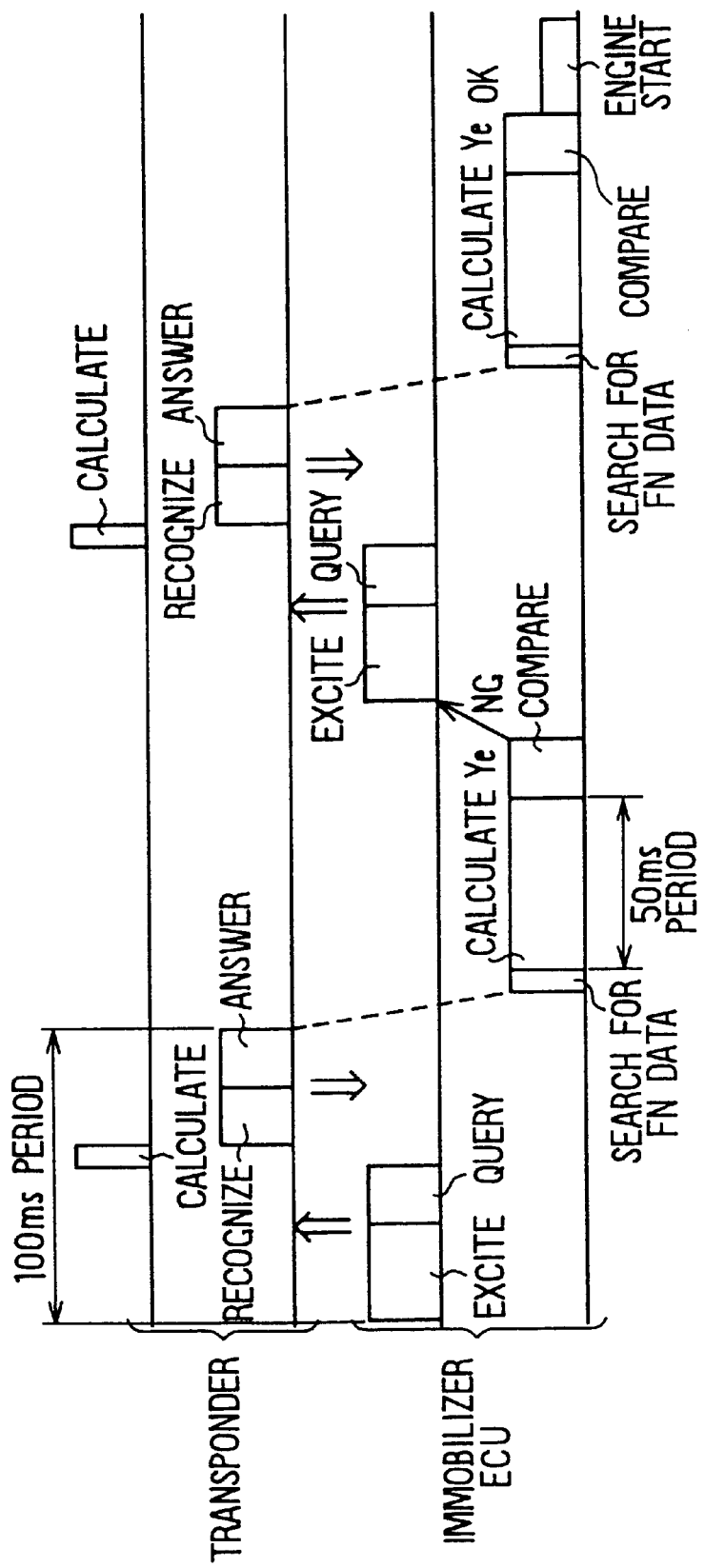
FIG. 12 is a timing diagram indicating processing concomitant with time elapse of a transponder and an immobilizer ECU.

Additionally, in the above-described second embodiment, when after the present response data has been received, this response data and the auto-response data are collated and the key is determined not to be a legitimate key, thereafter sending of the subsequent query data may be initiated (refer to FIG. 11). In this case, the generation time for the auto-response data of the second and later iteration of key-verifying processing becomes unnecessary. Therefore, the timing for sending the subsequent query data is shortened, and the response data can be received in a correspondingly shorter time, compared with a case wherein generation of auto-response data is performed with each iteration, thus requiring a long time.

For this reason, the cycle for performing a determination of whether a key is legitimate is shortened. Consequently, a key can be determined to be legitimate within a short time, even when determined not to be a legitimate key in at least a first iteration of key-verifying processing due to a communication fault.

Further, in the third embodiment, when the previous term terminated without a determination of a key being legitimate when a predetermined number of iterations of key-verifying processing are executed, in the subsequent term the same query data as in the previous term may be utilized. This is because even if a third party were to obtain knowledge of the response data of the previous term, collation with this data yields a mismatch.

What is claimed is:

1. A key-verifying apparatus, comprising:
   sending means for sending query data to a transponder attached to a key;
   receiving means for receiving response data with respect to said query data from said transponder;
   generating means for generating auto-response data with respect to said query data; and
   determining means for collating said response data and said auto-response data and for determining whether said key is legitimate;
   wherein in an interval after said receiving means has received said response data from said transponder in present key-verifying processing until said determining means finishes determining whether said key is legitimate, said sending means initiates sending of query data in subsequent key-verifying processing.

2. The key-verifying apparatus of claim 1, wherein a generating period wherein said generating means generates said auto-response in present key-verifying processing overlaps a transmission period from when said sending means sends said query data until said receiving means receives said response data in subsequent key-verifying processing.

3. The key-verifying apparatus of claim 1, wherein in an interval after said receiving means has received said response data from said transponder in present key-verifying processing and until said generating means finishes generating said auto-response data, said sending means initiates sending of query data in subsequent key-verifying processing.

4. The key-verifying apparatus of claim 1, wherein immediately after said receiving means has received said response data from said transponder in present key-verifying processing, said sending means initiates sending of query data in subsequent key-verifying processing.

5. The key-verifying apparatus of claim 1, wherein said determining means repeats said key-verifying processing until it has determined that the key is valid or until a predetermined number of iterations are completed.

6. A method for verifying a key inserted into a vehicle ignition key cylinder, comprising:
   sending query data to a key transponder;
   receiving response data with respect to said query data from said key transponder;
   generating auto-response data with respect to said query data;
   collating said response data and said auto-response data to determine whether said key is legitimate; and sending of query data in subsequent key-verifying processing in an interval from after said step of receiving said response data in present key-verifying processing until said step of collating is completed.

7. The method of claim 6, wherein said step of generating in present key-verifying processing overlaps a transmission period from said step of sending until said step of receiving during subsequent key-verifying processing.

8. The method of claim 6, wherein said step of sending initiates sending of query data in subsequent key-verifying processing, in an interval after said step of receiving in present key-verifying processing until said step of generating is finished.

9. The method of claim 6, wherein said step of sending is initiated in subsequent key-verifying processing immediately after said step of receiving in present key-verifying processing.

10. The method of claim 6, wherein said key-verifying processing is repeated until said key is determined to be legitimate or until a predetermined number of iterations are completed.

11. A key-verifying control unit, comprising:
a first processor for sending query data to a transponder attached to a key when said key is inserted into a vehicle ignition apparatus, and for receiving response data in response to said query data from said transponder; and
a second processor for generating auto-response data with respect to said query data, and for collating said response data and said auto-response data to determine whether said key is legitimate;
wherein in an interval after said first processor has received said response data from said transponder in present key-verifying processing until said second processor finishes determining whether a key is legitimate, said first processor initiates sending of query data in subsequent key-verifying processing.

12. A key-verifying apparatus for performing key-verifying processing, comprising:
sending means for sending a stimulation signal and query data to a transponder attached to a key, the transponder capable of operating by receiving the stimulation signal;
stimulation command means for performing a stimulation command to make the sending means send the stimulation signal;
receiving means for receiving response data with respect to said query data from said transponder;
generating means for generating auto-response data with respect to said query data; and
determining means for collating said response data and said auto-response data and for determining whether said key is legitimate wherein:
in said key-verifying processing, said sending means sends a stimulation signal and query data to a transponder, said receiving means receives said response data from said transponder, generating means generates said auto-response data, and determining means collates said response data and said auto-response data and determines whether said key is legitimate;
said determining means repeats its function in said key-verifying processing based on said stimulation command from said stimulation command means until said key is determined to be legitimate or until a predetermined number of iterations are completed; and
in an interval after said receiving means has received said response data from said transponder in present key-verifying processing until said determining means finishes determining whether said key is legitimate, said stimulation command means initiates stimulation command.

13. A key-verifying apparatus, comprising:
a transmitter for sending query data to a transponder attached to a key;
a receiver for receiving response data with respect to said query data from said transponder;
a data generating circuit for generating auto-response data with respect to said query data; and
a processor for collating said response data and said auto-response data and for determining whether said key is legitimate;
wherein in an interval after said receiver has received said response data from said transponder in present key-verifying processing until said processor finishes determining whether said key is legitimate, said transmitter initiates sending of query data in subsequent key-verifying processing.

* * * * *